US007013045B2

(12) United States Patent
Sommer et al.

(10) Patent No.: US 7,013,045 B2
(45) Date of Patent: Mar. 14, 2006

(54) USING MULTIPLE DOCUMENTS TO IMPROVE OCR ACCURACY

(75) Inventors: Ziva Sommer, Haifa (IL); Aviad Zlotnick, D.N. Galil Tachton (IL); Doug Billings, Germantown, MD (US)

(73) Assignee: International Business Machines Corporation, Armonk, NY (US)

( * ) Notice: Subject to any disclaimer, the term of this patent is extended or adjusted under 35 U.S.C. 154(b) by 541 days.

(21) Appl. No.: 09/910,870

(22) Filed: Jul. 24, 2001

(65) Prior Publication Data

US 2003/0021477 A1    Jan. 30, 2003

(51) Int. Cl.
*G06K 9/00*     (2006.01)

(52) U.S. Cl. ...................................... 382/181; 382/218

(58) Field of Classification Search ................ 382/112, 382/138, 176–177, 181, 187, 209, 218, 224, 382/229, 309, 310, 311, 317; 715/505–508
See application file for complete search history.

(56) References Cited

U.S. PATENT DOCUMENTS

| 4,813,077 | A | * | 3/1989 | Woods et al. ................ 382/138 |
| 5,050,221 | A | * | 9/1991 | Ohta et al. ................... 382/177 |
| 5,193,121 | A | * | 3/1993 | Elischer et al. ............. 382/138 |
| 5,305,396 | A | * | 4/1994 | Betts et al. .................. 382/175 |
| 5,680,480 | A | * | 10/1997 | Beernink et al. ........... 382/187 |
| 5,778,240 | A | * | 7/1998 | Buchman et al. ........... 715/530 |
| 5,923,792 | A | * | 7/1999 | Shyu et al. .................. 382/309 |
| 5,991,776 | A | * | 11/1999 | Bennett et al. ............. 707/205 |
| 6,055,327 | A | * | 4/2000 | Aragon ........................ 382/138 |

* cited by examiner

*Primary Examiner*—Daniel Miriam
(74) *Attorney, Agent, or Firm*—Browdy and Neimark, PLLC

(57) ABSTRACT

The present invention is directed to a system and method for processing data in which inputs of a plurality of records including respective entries in a first field and in a second field are received. At least some of the records are processed so as to find a relation between the entries in the first and second fields in the at least some of the records. One of the records comprising first and second entries in the first and second fields respectively is selected. Thereafter, the first and second entries are compared to the relation in order to verify the first and second entries.

36 Claims, 3 Drawing Sheets

USING MULTIPLE DOCUMENTS TO IMPROVE OCR ACCURACY

FIELD OF THE INVENTION

The present invention relates generally to data encoding and specifically to methods and apparatus for improving the accuracy of data encoded automatically by a computer.

BACKGROUND OF THE INVENTION

In many document imaging systems, large numbers of forms are scanned into a computer, which then processes the resultant document images to extract pertinent information. Typically the forms comprise preprinted templates, containing predefined fields that have been filled in by hand or with machine-printed characters. Before extracting the information that has been filled into any given form, the computer must first know which field is which. Only then can the computer process the information that the form contains. The computer then reads the contents of the fields in the form, typically using methods of optical character recognition (OCR), as are known in the art, and arranges the OCR results in a table or database record.

In many of these imaging systems, it is crucial that the information in the forms be read out correctly. For this purpose, automated OCR is commonly followed by manual verification of the OCR results. Often, the computer that performs the OCR also generates a confidence rating for its reading of each character or group of characters. Human operators perform the verification step, either by reviewing all the fields in the original document, and correcting errors and rejects discovered in the OCR results, or by viewing and correcting only the characters or fields that have a low OCR confidence level. Since verification of the OCR is typically the most costly part of the process, it is generally desirable to attain the highest possible level of confidence in the automated processing phase, and thus to minimize the portion of the results that must be reviewed by a human operator.

SUMMARY OF THE INVENTION

Preferred embodiments of the present invention provide methods and systems for improving reliability of assigning entries to data fields. Inputs of many records are received on one or more forms that have been input to a data processing system. Each record comprises respective entries in at least two fields, which are processed so as to find a relationship between the entries in different fields. Once a relationship between two fields has been determined to hold true over a large group of the records, it can be used to verify the entries in these fields. The same applies to relations between more than two fields. This invention enables such a data processing system to take advantage of the large number of data points that are typically stored and processed in typical document processing systems, so as to improve the confidence level of results that are coded automatically, typically by OCR, and thus to reduce the need for operator involvement in correcting and verifying the results.

In preferred embodiments of the present invention, a computer extracts a large number of records from a collection of filled-in forms, a table, or other corpus of data. Each record comprises respective entries in at least a first field and a second field. The records are processed so as to find a relation between the entries in the first and second fields that applies over substantially all of the records, or at least over a large, defined subset. The computer then compares the entries to the relation in order to verify or classify the contents of the fields with enhanced accuracy. This technique can be applied both to the records that were originally processed in order to find the relation and to additional records received thereafter.

Typically, the inter-field relations are used to improve OCR accuracy, particularly in reading and processing of numerical entries in the fields. For example, if analysis of the reference records determines that an entry in one field has a linear or other mathematical relation to the entry in another field, then this relation may be applied to verify and improve the confidence levels of computer coding of both fields in the records. Alternatively, if one of the entries does not match the relation, then it may be substituted by a next-best candidate suggested by OCR processing, which enables the relation to hold for the updated entries. In either case, use of the relation between the fields makes it possible to verify the field contents automatically, with an adequate level of confidence, in at least some cases that would otherwise have to be consigned to manual key-in.

In some preferred embodiments of the present invention, values of fields in question define corresponding dimensions in a N-dimensional space, in which the values of the fields are plotted. The relation among the fields is determined by fitting one or more lines or curves to the values. All entries matching the relation must then appear in the vicinity of the lines or curves, at least to within a predefined tolerance, and these entries are verified automatically. Errors and wrongly recognized entries from an OCR process appear as relatively distant and isolated points from the relation. These entries may be referred to a human operator for manual entry.

In one preferred embodiment, a confidence level is assigned to the relation. The confidence level typically depends upon the number of entries per field, and may also depend upon the spread or variance of these points with respect to the relation. When a new entry is inputted, it is compared to the relation, and another confidence level may accordingly be assigned to the entry. If this confidence level is high, then the entry is preferably considered to have been verified. Conversely, if the confidence level is low, then the entry may be marked as suspect, or may be rejected. Alternatively or additionally, the entry may be corrected as a result of a low confidence level.

There is thus provided in accordance with a preferred embodiment of the present invention, a method for processing data including:

receiving as inputs a plurality of records, each record comprising respective entries in a first field and in a second field, processing at least some of the records so as to find a relation between the entries in the first and second fields in the at least some of the records, selecting for verification one of the records comprising first and second entries in the first and second fields, respectively, and comparing the first and second entries to the relation in order to verify the first and second entries.

Preferably, processing the at least some of the records includes processing alphanumeric characters, and the relation includes a semantic relationship between words formed by the characters. Further preferably processing the at least some of the records includes plotting points corresponding to the entries in a multidimensional space, and finding a geometrical relationship between the points in the space.

In a preferred embodiment, finding the geometrical relationship includes fitting one or more lines to at least a portion of the entries. Preferably, comparing the first and second entries includes plotting an entry point in the multidimensional space corresponding to the first and second entries, and verifying the entries responsive to a proximity of the entry point to one of the lines.

Preferably, processing the at least some of the records includes finding a mathematical relationship between the entries in the first and second fields. Further preferably, processing the at least some of the records further includes assigning a confidence level to the relation, and comparing the entries includes verifying the entries responsive to the confidence level.

In a preferred embodiment, assigning the confidence level to the relation includes assigning the confidence level responsive to a quantity of the at least some of the records that satisfy the relation.

Preferably, comparing the first and second entries to the relation includes assigning a confidence level to the verification of the selected record responsive to a fit of the first and second entries to the relation. Further preferably, comparing the first and second entries comprises correcting one or more of the first and second entries so as to accord with the relation.

In a preferred embodiment, processing the at least some of the records includes finding alternative first and second relations between the entries in the first and second fields, and comparing the first and second entries includes verifying the entries if they accord with either of the first and second relations.

In another preferred embodiment, receiving the plurality of records includes receiving entries that have been coded by optical character recognition (OCR), and wherein comparing the first and second entries comprises verifying that the OCR has correctly coded the entries.

There is also provided in accordance with another preferred embodiment of the present invention, data processing apparatus including:

a memory arranged to store a plurality of records, each record including respective entries in a first field and in a second field, and a processor arranged to read and process at least some of the records so as to find a relation between the entries in the first and second fields in at least some of the records, and further arranged to select for verification one of the records, which includes first and second entries in the first and second fields respectively, and to compare the first and second entries to the relation in order to verify the first and second entries.

There is further provided in accordance with another preferred embodiment of the present invention, a computer software product for processing data, the product including a computer-readable medium in which program instructions are stored, which instructions, when read by a computer, cause the computer to:

receive as inputs a plurality of records, each record including respective entries in a first field and in a second field, process at least some of the records so as to find a relation between the entries in the first and second fields in the at least some of the records, select for verification one of the records including first and second entries in the first and second fields, respectively, and compare the first and second entries to the relation in order to verify the first and second entries.

The present invention will be more fully understood from the following detailed description of the preferred embodiments thereof, taken together with the drawings, in which:

DETAILED DESCRIPTION OF PREFERRED EMBODIMENTS

Figure 1:
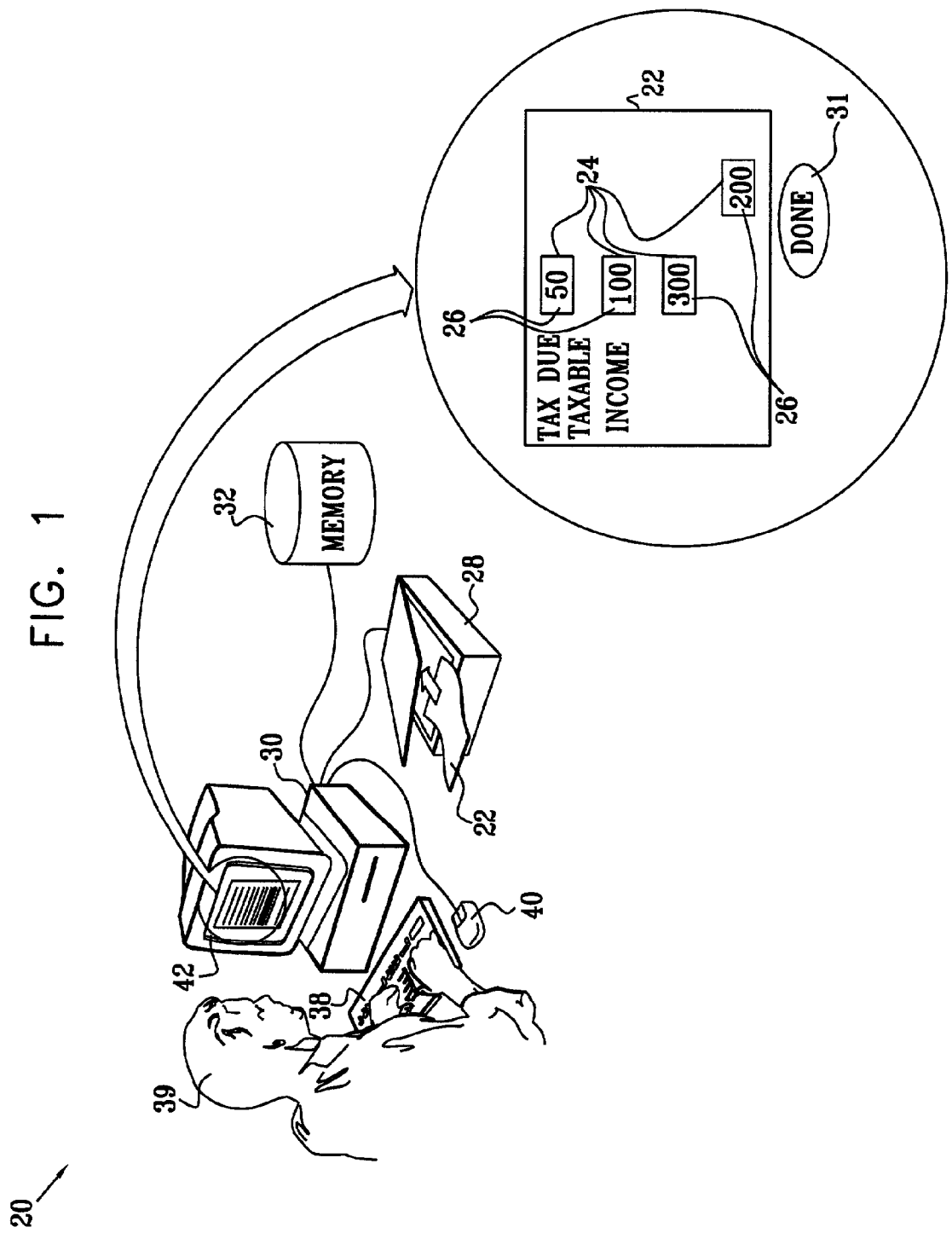
FIG. 1 is a simplified pictorial illustration showing a system for processing data, in accordance with a preferred embodiment of the present invention.

FIG. 1 is a simplified pictorial illustration showing a system 20 for verification of coding of information, in accordance with a preferred embodiment of the present invention. System 20 receives a document 22 for extraction of information therefrom. The document preferably comprises a preprinted form having fields 24 that are filled in with handwritten, typed or printed contents 26. The contents typically comprise alphanumeric characters, although they may comprise symbols or marks of other types, generated by hand or by machine. In order to extract information from document 22, system 20 performs OCR on an image of the document, and thus assigns a code (such as an ASCII code) to each character. Typically, as shown in FIG. 1, the characters comprise numbers.

A scanner 28 captures an image of document 22 and conveys the corresponding image data to a document processor 30, typically comprising a suitable general-purpose computer. Alternatively, the document is inputted to the processor from another source, typically in electronic form, either as a document image or as characters keyed in by an operator. Further alternatively, although the methods described hereinbelow are applied specifically to verification of OCR characters, the principles of these methods are applicable to verification of data coding of substantially any type.

These OCR and verification functions of processor 30 (typically together with other document processing functions) are preferably performed using software running on processor 30. The software may be supplied on tangible media, such as diskettes or CD-ROM, and loaded into the processor. Alternatively, the software may be downloaded to the processor via a network connection or other electronic link. Further alternatively, processor 30 may comprises dedicated, hard-wired elements or a digital signal processor designed to carry out some or all of the processing steps.

Returning to FIG. 1, processor 30 typically stores a large number of entries 26 for fields 24 from forms 22 in memory 32. In the present example, the entry in the highest top-left corner "50" is the tax paid on monthly income "100" appearing as the entry directly beneath it. After processing a large number of forms, processor 30 develops the relation $y=m*x$, for example, wherein y is the entry in the top left hand corner field, and x is the entry in the field beneath it. The gradient "m" is found to be 0.48 with a high level of confidence. Typically, there is also a tolerance level set for deviation that is allowed in the actual relation between any single pair of entries and the precise value of m that has been calculated. Thus, the system may accept the entry "50" on this form, although according to tax tables it should be "48".

The entry below the "100" is the quarterly income "300". It becomes apparent that the relation between the quarterly income, designated as z is 3x. Thus, processor 30 builds up a data base of the relation between "x", "y" and "z", as more forms of the same type are processed. In this case, the relations between "x", "y" and "z" are linear. However, in other cases, these relations are non-linear, semantic or other.

Each group of n different fields define a space of n dimensions, as in the case above. Records in which the entries are in accordance with a defined relation applying to many of the records will fall on or near a line or other defined geometric structure in the space. OCR errors and arithmetic errors are likely to appear as isolated points far away from the line or other structure. Furthermore, the OCR errors and the arithmetic errors are likely to behave differently, and this may possibly be used as a tool for differentiating between OCR and arithmetic errors. For example, if substitution of a "4" for a "9" in a given entry (particularly an entry that was assigned a low confidence level in OCR processing) will bring the entry onto the expected line, the "9" may be automatically corrected to a "4". On the other hand, if the applicable tax table says that the tax payable on $1010 should be $102, but the tax paid on this income by a given taxpayer was $101, and this amount is in accordance with the appropriate relation to within the defined tolerance, the OCR entry of "101" will preferably be verified.

In order to define the relations between the entries, the records are preferably plotted by processor 30 in the n-dimensional space. Hough transforms, amongst others, may be used for each space to define geometric shapes, defined by the inter-field relations. A collection of possible shapes is defined for the relations between the n fields. Processor 30 then compares the existing and, subsequently, new entries in fields 26 to the applicable shape or shapes. If the entry fits a structure within the shape which has many other points, then processor 30 raises the confidence level of the entry. Conversely, if the entry is external to the shapes, then its confidence is normally decreased, typically, with a concomitant decrease in the confidence as the distance from the shape increases. Similarly, if the number of points or entries is relatively small for a given shape, then the confidence level of the newly inputted entry which fit it may be reduced.

Figure 2A:
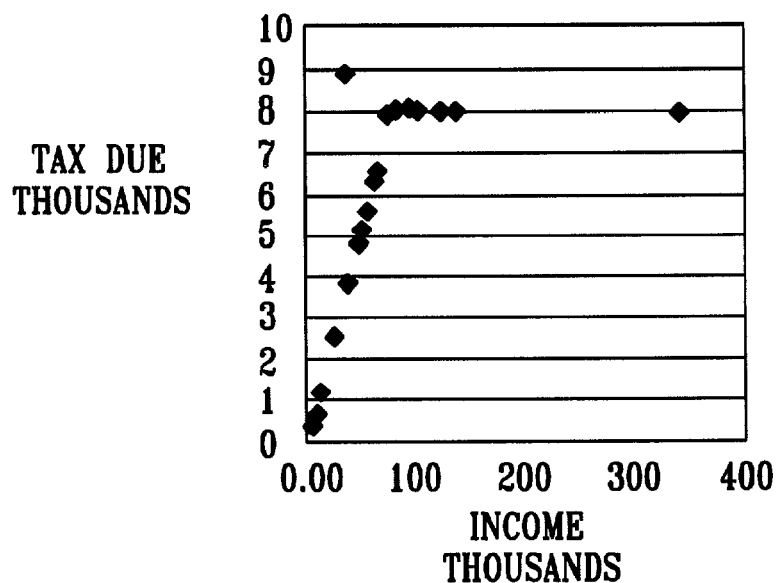
FIGS. 2A and 2B are graphs of plotted data which are used to evaluate the fit of the data to a relationship, in accordance with a preferred embodiment of the present invention.
Figure 2B:
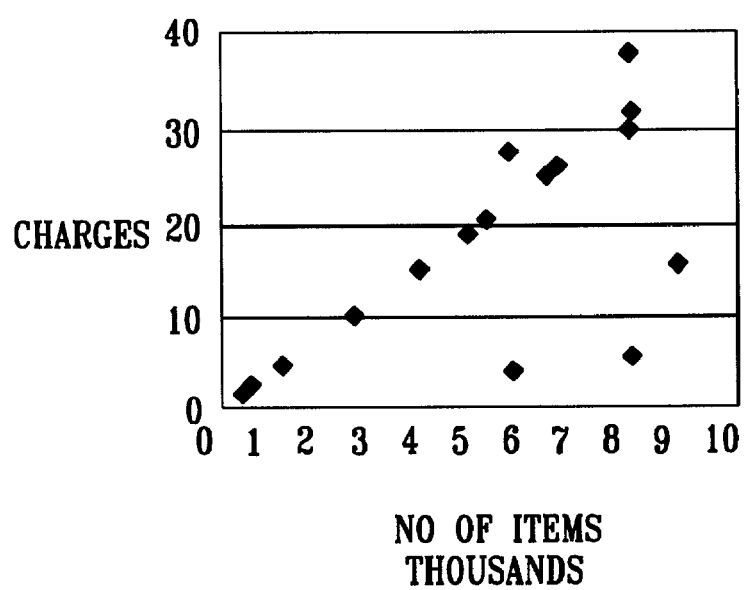

Reference is now made to FIGS. 2A and 2B, which are exemplary graphs of plotted data which are used to evaluate the fit of the data to a relationship, in accordance with a preferred embodiment of the present invention. Many entries 26 from fields 24 (FIG. 1) are stored by processor 30. The processor builds up a relationship between two fields such as of "taxable income" and "tax due" from a large number of forms. In the example of FIG. 2A, it is found that there are two linear regions in the relationship. There is a diagonal line from (0,0) to (80,000, 8,000) and then a horizontal line from (80,000, 8,000), to (400,000, 8,000). Values on the two lines are verified automatically by processor 30, as they belong the relationship, whereas the anomalous point at (35,000, 9,000) which does not sit on, or proximal to, the lines of the relationship requires further verification.

FIG. 2B illustrates the relationship between entries 26 of another two fields 24. It can be seen that there is a relationship charges=0.04×number of items, which does not hold beyond 8000 items. All the entries which fit the relationship charges=0.04×number of items are verified. All anomalous entries to the relationship require further verification or correction, although they are not necessarily incorrect. An entry having coordinates (6000, 28) is also verified, as it is within a reasonable tolerance of the defined linear relationship, whereas entry (6000,4) requires manual inspection. This method of character verification significantly improves the chance of the OCR system reporting that which was actually written on the original form.

The method described herein also improves the reliability of processing tax forms. The tax forms of tax schemes having several different bands or levels of taxation rates provide clusters of relationships depending, for example, on standard deductions taken by different groups of taxpayers. Provided that there are sufficient forms processed, this method enables reliable verification of the items in the fields. Furthermore, this method can be applied to other documents, forms and questionnaires.

Figure 3:
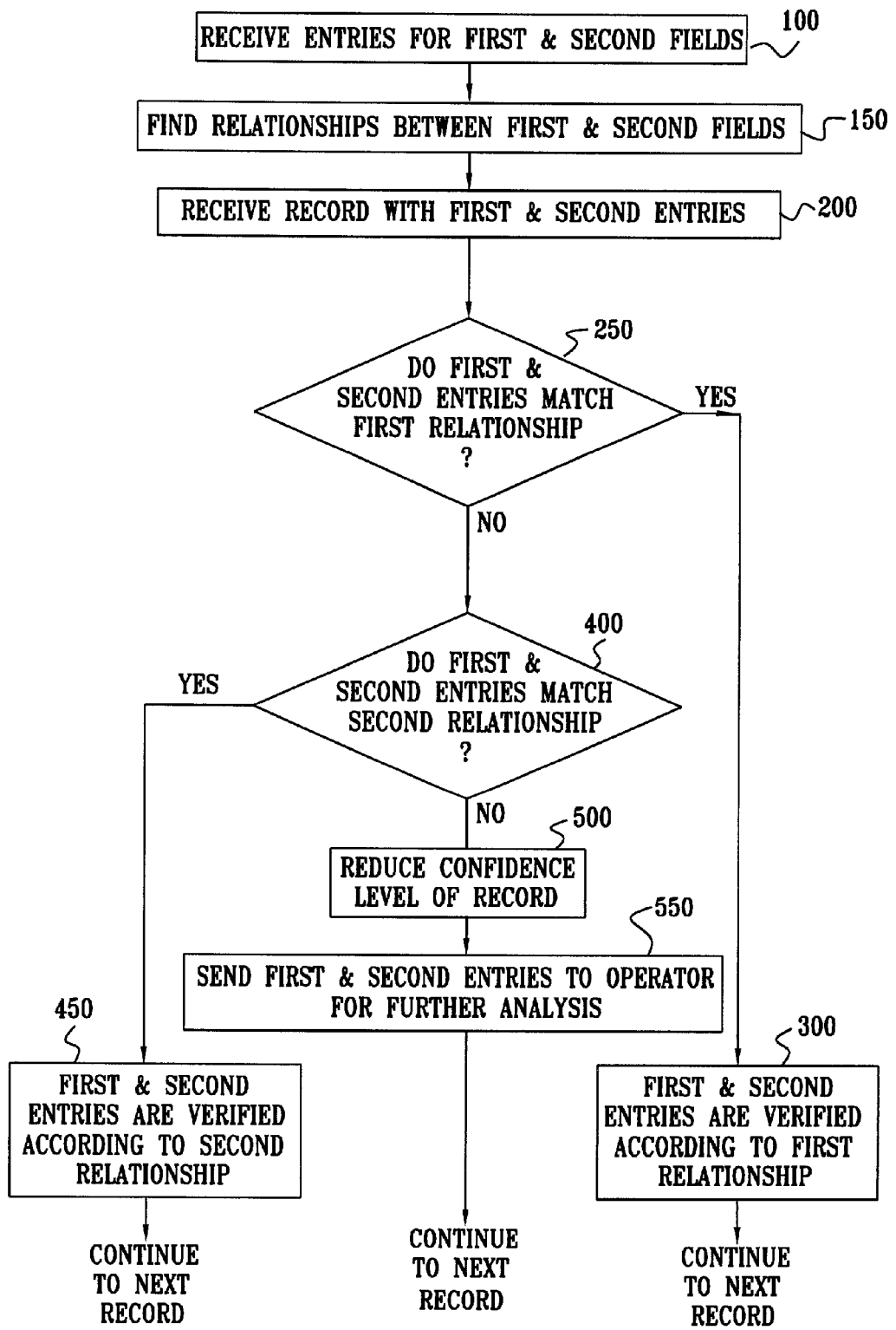
FIG. 3 is a flow chart that schematically illustrates a method for processing data fields in documents, in accordance with a preferred embodiment of the present invention.

Reference is now made to FIG. 3, which is a flow chart that schematically illustrates a method for processing data fields in documents, in accordance with a preferred embodiment of the present invention.

In a receiving step 100, processor 30 receives a large number of inputs to first and second fields 24. These inputs, or entries are typically received by means of a form 22 or table being scanned by a scanner 24 (FIG. 1), and the scanned data being stored in memory 32 of processor 30. Processor 30 compares two or more fields 24 in a comparison step 150. This is typically performed by mathematical or language processing methods known in the art such as Hough transform, regression analysis, other transformations, or word matching, and was described above with reference to FIGS. 2A and 2B.

There is generally a statistical definition of fit, or a confidence level assigned to the relation between the entries 26 in the two (or more) fields. Further manipulations and transformations known in the art may be performed to find a relationship between the entries of the first and second fields. For example, if the characters are numbers and a linear fit between the two fields gives a low confidence level, then further analysis may be performed using more complex curve fitting analysis.

The relation between the two fields 24 is typically geometrical or mathematical, as described above, but it may also be of a semantic or other nature. Entries 26 typically comprise alphanumeric characters, but they may also comprises symbols or characters of other types. For example, if an address comprises the name of the city "Stanford", then another field comprising the zip code may be utilized to define whether this is Stanford in Calif. or Stamford in Conn., and the "n" may be changed to "m" automatically by processor 30. In another example, one field 24 comprises a state in the United States, and a second field comprises the telephone number. In order to find a relationship between the fields for verifying the state code and telephone are code, the second field is preferably defined as the first three digits of the second field, so that only the area code is considered, and the rest of the telephone number is ignored.

In some cases, the first and second fields may not be found in the same place on all of the forms or in all of the records in a table. In such cases, the relationship that is found between the first and second fields can be used to determine the appropriate field assignment notwithstanding the differences in layout among the different forms or records.

A confidence level is typically assigned to the relation. The confidence level typically depends upon the number of entries 26 per field 24, and may also depend upon the spread or variance of these entries 26 with respect to the relation.

In a second receiving step 200, a record comprising a first entry and a second entry for each of the two respective fields is received for verification. This record may be one of the original group of records that was input at step 100 and processed at step 150, or it may be a new record. Processor 30 then compares the new entry for each of the two fields to the relation in a comparison step 250. If the new entry fits the relationship with a sufficient confidence level, typically greater or equal to a predetermined confidence level defined in step 150, then the first entry can be assumed to belong to the first field, and the second entry to the second field. The entry is verified consequentially in a verification step 300, and the system continues to the next record.

Conversely, if the confidence level at step 250 is low, then the entry may be marked as suspect, or may be rejected. If there is no match according to the definition determined in step 150, then processor 30 may perform some manipulation of the first and second entries. For example, in another matching step 400, the entries are compared to a second relationship. For example, in step 150 a linear first relationship between the first and second fields may be found with a first confidence level, and a non-linear second relationship between the first and second fields may be found, having a lower confidence level than that of the linear relationship. If a match is found between the first and second fields and the second relationship in step 400, then the entries in the first and second fields may be verified according to the second relationship in another verification step 450. As the second relationship has a lower confidence level than the first one, it may be desirable in this case to take further verification steps, such as sending the record to a human operator for verification.

It occurs quite often that a person enters information in the wrong fields on a form, such that entries in a first and second field are switched. Thus, at step 400, the first and second entries may be automatically swapped so as to fit the relation. Other manipulations and transformations known in the art may also be performed, so as to make entry 26 sit on a curve or within a geometric shape, and consequentially may enable the system to improve the confidence level of the entry, and/or to change the values of the entries, if necessary. The entry is preferably sent to the operator for verification in these cases, as well, but even so, verification is a simple and rapid task for the operator to perform by comparison with time-consuming manual correction.

If no match is found following step 400, the confidence level of the first and second entries is preferably reduced, at a confidence reduction step 500, even if the OCR confidence level of the entries was initially high. These entries are typically sent to an operator for visual analysis and verification in a sending step 550. Alternatively, they may be rejected and stored in a database of rejected entries in memory 32. These manipulations enable entries with low confidence levels to be processed efficiently and accurately.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

What is claimed is:

1. A method for processing data comprising:
    receiving as inputs a plurality of records, each record comprising respective first and second data that have been entered in a first field and in a second field;
    processing the respective data from at least some of the records so as to find a relation between the data that have been entered in the first and second fields in the at least some of the records, wherein the first and second data are different from one another;
    selecting for verification one of the records comprising first and second entries in the first and second fields, respectively; and
    comparing the first and second entries to the relation in order to verify the first and second entries.

2. A method according to claim 1, wherein processing the at least some of the records comprises processing alphanumeric characters, and wherein the relation comprises a semantic relationship between words formed by the characters.

3. A method according to claim 1, wherein processing the at least some of the records comprises plotting points corresponding to the entries in a multidimensional space, and finding a geometrical relationship between the points in the space.

4. A method according to claim 3, wherein finding the geometrical relationship comprises fitting one or more lines to at least a portion of the entries.

5. A method according to claim 4, wherein comparing the first and second entries comprises plotting an entry point in the multidimensional space corresponding to the first and second entries, and verifying the entries responsive to a proximity of the entry point to one of the lines.

6. A method according to claim 1, wherein processing the at least some of the records comprises finding a mathematical relationship between the entries in the first and second fields.

7. A method according to claim 1, wherein processing the at least some of the records further comprises assigning a confidence level to the relation, and wherein comparing the entries comprises verifying the entries responsive to the confidence level.

8. A method according to claim 7, wherein assigning the confidence level to the relation comprises assigning the confidence level responsive to a quantity of the at least some of the records that satisfy the relation.

9. A method according to claim 1, wherein comparing the first and second entries to the relation comprises assigning a confidence level to the verification of the selected record responsive to a fit of the first and second entries to the relation.

10. A method according to claim 1, wherein comparing the first and second entries comprises correcting one or more of the first and second entries so as to accord with the relation.

11. A method according to claim 1, wherein processing the at least some of the records comprises finding alternative first and second relations between the entries in the first and second fields, and wherein comparing the first and second entries comprises verifying the entries if they accord with either of the first and second relations.

12. A method according to claim 1, wherein receiving the plurality of records comprises receiving entries that have been coded by optical character recognition (OCR), and wherein comparing the first and second entries comprises verifying that the OCR has correctly coded the entries.

13. Data processing apparatus comprising:
    a memory arranged to store a plurality of records, each record comprising respective first and second data that have been entered in a first field and in a second field; and
    a processor arranged to read and process the respective data from at least some of the records so as to find a relation between the data that have been entered in the first and second fields in at least some of the records, wherein the first and second data are different from one another, and further arranged to select for verification one of the records, which comprises first and second entries in the first and second fields respectively, and to compare the first and second entries to the relation in order to verify the first and second entries.

14. Apparatus according to claim 13, wherein the processor is arranged to read and process alphanumeric characters, and wherein the relation comprises a semantic relationship between words formed by the characters.

15. Apparatus according to claim 13, wherein the processor is further arranged to plot points corresponding to the entries in a multidimensional space, and wherein the relation comprises a geometrical relationship between the points in the space.

16. Apparatus according to claim 15, wherein the processor is arranged to find the geometrical relationship by fitting one or more lines to at least a portion of the entries.

17. Apparatus according to claim 16, wherein the processor is further arranged to verify the entries responsive to a proximity of the entry point to one of the lines.

18. Apparatus according to claim 13, wherein the relation comprises a mathematical relationship between the entries in the first and second fields.

19. Apparatus according to claim 13, wherein the processor is also arranged to assign a confidence level to the relation, and to verify the entries responsive to the confidence level.

20. Apparatus according to claim 19, wherein the processor is arranged to assign the confidence level responsive to a quantity of the at least some of the records that satisfy the relation.

21. Apparatus according to claim 13, wherein the processor is further arranged to assign a confidence level to the verification of the selected record responsive to a fit of the first and second entries to the relation.

22. Apparatus according to claim 13, wherein the processor is further arranged to correct one or more of the first and second entries so as to accord with the relation.

23. Apparatus according to claim 13, wherein the processor is arranged to find alternative first and second relations between the entries in the first and second fields, and to verify the first and second entries if they accord with either of the first and second relations.

24. Apparatus according to claim 13, wherein the entries comprise entries that have been coded by optical character recognition (OCR), and wherein the processor is arranged to verify that the OCR has correctly coded the entries.

25. A computer software product for processing data, the product comprising a computer-readable medium in which program instructions are stored, which instructions, when read by a computer, cause the computer to:

receive as inputs a plurality of records, each record comprising respective first and second data that have been entered in a first field and in a second field;

process the respective data from at least some of the records so as to find a relation between the data that have been entered in the first and second fields in the at least some of the records, wherein the first and second data are different from one another;

select for verification one of the records comprising first and second entries in the first and second fields, respectively; and compare the first and second entries to the relation in order to verify the first and second entries.

26. A product according to claim 25, wherein the instructions cause the computer to process alphanumeric characters, and wherein the relation comprises a semantic relationship between words formed by the characters.

27. A product according to claim 25, wherein the instructions cause the computer to plot points corresponding to the entries in a multidimensional space, and to find a geometrical relationship between the points in the space.

28. A product according to claim 27, wherein the instructions cause the computer to fit one or more lines to at least a portion of the entries.

29. A product according to claim 28, wherein the instructions cause the computer to plot an entry point in the multidimensional space corresponding to the first and second entries, and to verify the entries responsive to a proximity of the entry point to one of the lines.

30. A product according to claim 25, wherein the instructions cause the computer to find a mathematical relationship between the entries in the first and second fields.

31. A product according to claim 25, wherein the instructions cause the computer to assign a confidence level to the relation, and to compare the entries so as to verify the entries responsive to the confidence level.

32. A product according to claim 31, wherein the instructions cause the computer to assign the confidence level responsive to a quantity of the at least some of the records that satisfy the relation.

33. A product according to claim 25, wherein the instructions cause the computer to assign a confidence level to the verification of the selected record responsive to a fit of the first and second entries to the relation.

34. A product according to claim 25, wherein the instructions cause the computer to correct one or more of the first and second entries so as to accord with the relation.

35. A product according to claim 25, wherein the instructions cause the computer to find alternative first and second relations between the entries in the first and second fields, and to verify the entries if they accord with either of the first and second relations.

36. A product according to claim 25, wherein the instructions cause the computer to receive entries that have been coded by optical character recognition (OCR), and to verify that the OCR has correctly coded the entries.

* * * * *